United States Patent [19]

Ojima

[11] Patent Number: 5,030,170
[45] Date of Patent: Jul. 9, 1991

[54] BELT OR CHAIN TENSIONER FOR POWER TRANSMITTING SYSTEM

[75] Inventor: Juji Ojima, Ailsawa, Japan
[73] Assignee: NHK Spring Co., Ltd., Yokohama, Japan
[21] Appl. No.: 519,773
[22] Filed: May 7, 1990

[30] Foreign Application Priority Data

May 10, 1989 [JP] Japan ................................. 1-116262

[51] Int. Cl.⁵ .............................................. F16H 7/08
[52] U.S. Cl. ..................................... 474/111; 474/138
[58] Field of Search ................. 474/101, 111, 136, 138

[56] References Cited

U.S. PATENT DOCUMENTS

| | | | |
|---|---|---|---|
| 4,702,726 | 10/1987 | Ojima et al. | 474/101 |
| 4,722,720 | 2/1988 | Ojima et al. | 474/101 |
| 4,743,224 | 5/1988 | Yoshikama et al. | 474/101 |
| 4,902,266 | 2/1990 | Ojima et al. | 474/111 |
| 4,934,984 | 6/1990 | Ojima et al. | 474/111 |

FOREIGN PATENT DOCUMENTS 0159845  7/1987  Japan ................................. 474/111

Primary Examiner—Bruce M. Kisliuk
Attorney, Agent, or Firm—Fleit, Jacobson, Cohn, Price, Holman & Stern

[57] ABSTRACT

A belt or chain tensioner includes a collar mounted between a bearing and a spring seat. The spring seat includes a externally mounted on a cylinder portion of a rotational cylinder so as to prevent movement of the rotational cylinder in an axial direction and penetration of a torsion spring into a ring groove provided between the cylinder portion and a male threaded portion of the rotational cylinder.

4 Claims, 4 Drawing Sheets

BELT OR CHAIN TENSIONER FOR POWER TRANSMITTING SYSTEM

BACKGROUND OF THE INVENTION

The present invention relates to a belt or chain tensioner for motorcycles and automobiles and, more particulary, to a tensioner for tensioning a drive a chain or belt for driving camshaft of an engine.

A conventional tensioner, such as a belt tensioner or a chain tensioner is used to apply constant tension on a belt or chain even when the belt or chain looses predetermined tension due to elongation or slackening caused by wear or friction. For this reason, it is preferable that the tensioner be kept advanced at all times in a tensioning direction and that it have characteristics of a rigid object against a counterforce in a direction opposite the tensioning direction. FIG. 5 shows a vertical section of a conventional tensioner.

The tensioner comprises a casing 1 with a housing 1a formed in an axial direction, a rotational cylinder 2 inserted rotatably in said housing, a tension rod 3 engaged with a threaded portion of the rotational cylinder 2, and a torsion spring 4 inserted externally on the rotational cylinder 2. One end 4a of the spring is inserted in a slit 2a formed on the rear end of rotational cylinder 2, and other end 4b is inserted in a long groove 1b formed on the front portion of housing 1a for driving the rotational cylinder 2. A seal bolt 6 is screwed on the rear end of the casing. The top of said tension rod 3 is covered with a cap 8 fixed with a spring pin 7, whereby a chain or belt is tensed directly or indirectly to keep constant tension. The tension rod 3 is externally round and diametrically has two plain surfaces. Tension rod 3 is inserted freely in a corresponding slot of same shape formed in the bearing 9 so as not to turn, whereby the rotating force of the rotational cylinder 2 can be converted into an urging force.

This type of tensioner can be applied with a predetermined torsional torque by using a flat driver inserted through threaded hole on the rear end of the tensioner after mounting the component in the housing of casing. The threaded hole can then be hermetically closed with an "O" ring and the seal bolt. Thus the tensioner may be mounted, for example, on the outer wall of equipment, such as engine body, by inserting the front portion of the casing so that the cap of tension rod may work to keep constant tension on chain or belt by means of the restoring force of the torsion spring.

The tensioner works satisfactorily when mounted. However it is not easy to mount components, such as a tension rod, a rotational cylinder and a torsion spring in the tensioner housing. Therefore a ring groove of small diameter is formed between the cylinder portion and threaded portion so that a flat washer 10 may be freely mounted so as to mount a collar 11 between the bearing 9 and the flat washer 10. In this way, movement of the rotational cylinder 2, tension rod 3 and the torsion spring 4 in the axial direction can be prevented by the flat washer 10, collar 11, bearing 9 and the snap ring 12.

Hereinafter the problems to be solved by the present invention will be explained. In the conventional belt or chain tensioner, when the torsion spring 4 is wound to get torsional torque, the wire end 4b used to penetrate into the gap between the flat washer 10 and the rotational cylinder 2 sometimes impedes the normal function of the torsion spring 4 or the normal rotation of the rotational cylinder 2. This is because the torsion spring 4 extends in an axial direction when wound and, at the same time, eccentric movement can occur, causing the problems aforementioned. Then, it is effective to make the gap between the collar 11 and the flat washer 10 as small as possible, but it is very hard to reduce this gap ignoring the diameter of wire material.

SUMMARY OF THE INVENTION

The present invention has been developed taking the above situation into consideration so as to provide a belt or chain tensioner wherein a hook of a torsion spring will not be entangled.

Now, the means to solve the problems aforementioned will be explained.

The belt or chain tensioner according to the present invention is a tensioner having a rotational cylinder inserted in a torsion spring so as to rotate and to engage with a tension rod of which rotation is impeded by a bearing sliding in slots of the casing, whereby the rotational force of said rotational cylinder can be converted to an urging force for said tension rod in an axial direction. A spring seat with a sleeve externally inserted on said rotational cylinder to support said torsion spring and to stop the movement of said rotational cylinder in the axial direction, and a collar mounted between the tension rod side of said spring seat and said bearing, are provided.

DETAILED DESCRIPTION OF THE PREFERRED EMBODIMENT

Figure 1:
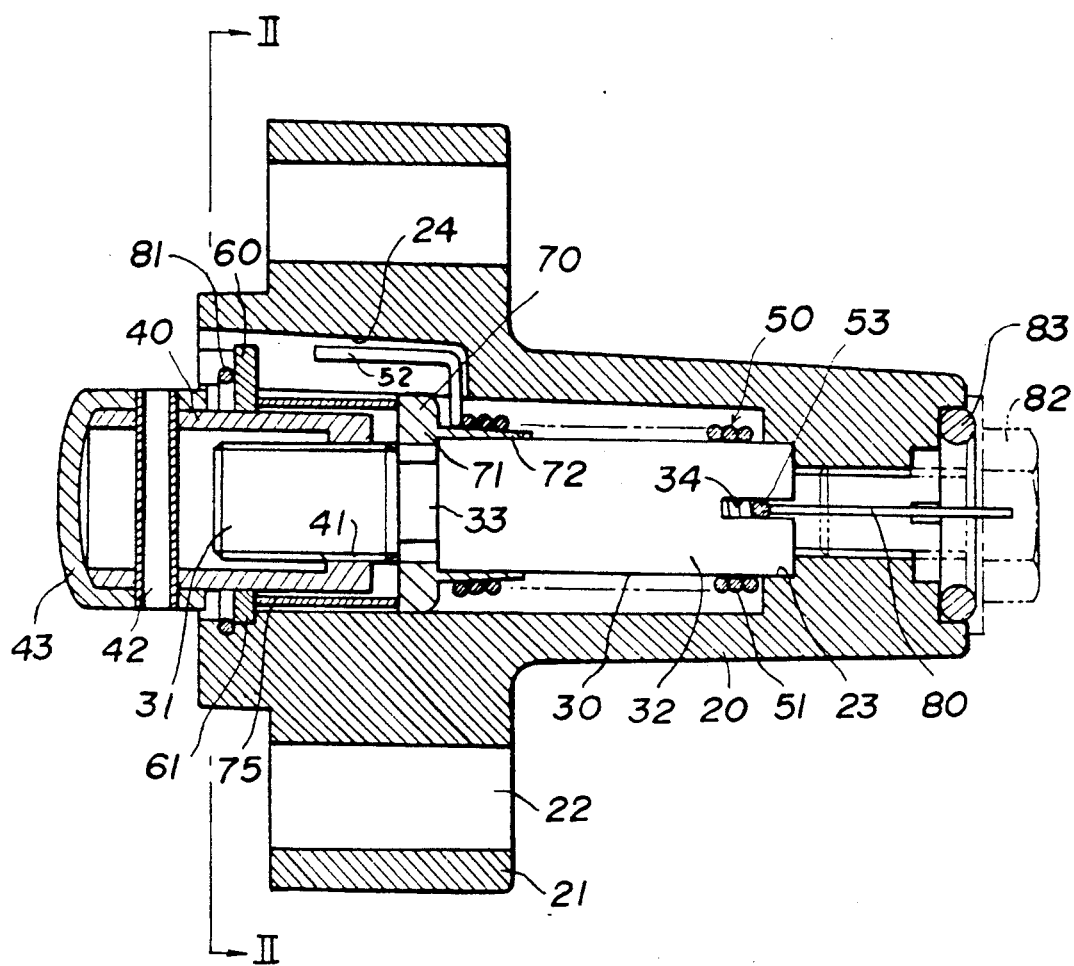
FIG. 1 illustrates a vertical section of an embodiment according to the present invention.
Figure 2:
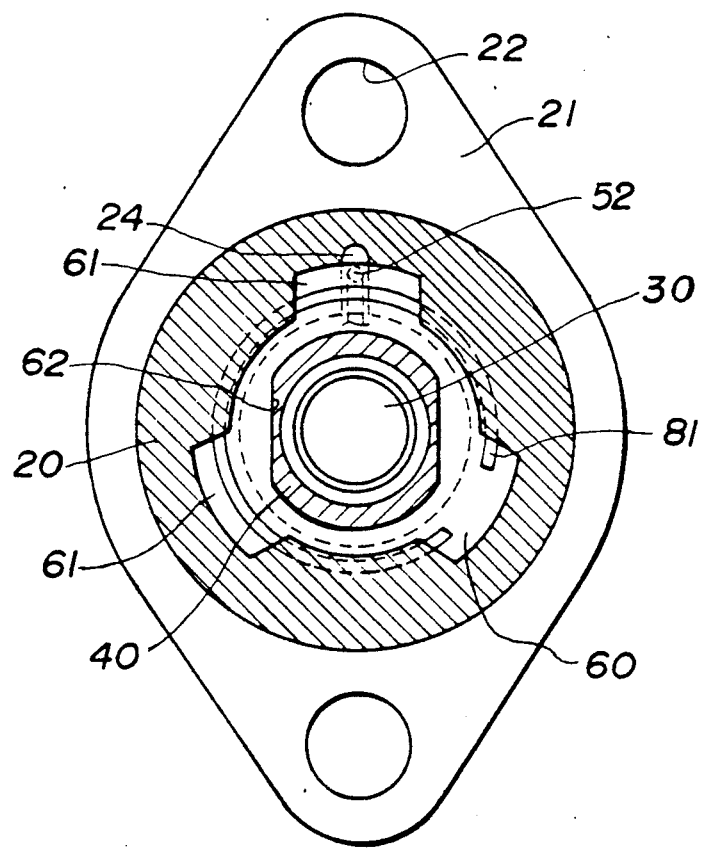
FIG. 2 shows a section II—II of the FIG. 1.

Hereinafter, an embodiment according to the present invention will be explained referring to FIGS. 1 to 3.

The tensioner comprises a casing or housing 20, a rotational cylinder 30 screwed in a tension rod 40 both the cylinder and the rod are inserted in the casing 20. A torsion spring 50 is provided for driving the rotational cylinder 30 and a bearing 60 is mounted on the front end of casing 20 for stopping the rotation of tension rod 40.

The casing 20 is provided with a flange portion 21 extending in radial direction, wherein two holes are formed in diametrical positions for fixing the casing with bolts on an outer wall of equipment such as engine (not illustrated).

The rotational cylinder 30 comprises a male threaded portion 31 on the front end and a cylinder portion 32 on the rear end, between which a ring groove 33 is formed. The rear end of cylinder portion 32 of the rotational cylinder 30 is supported by a bearing portion 23 formed in the casing 20. On the rear end of cylinder portion 32, a slit 34 is formed so as to fix rear end of the torsion spring 50 for winding. The male threaded portion of rotational cylinder 30 is engaged with female threaded portion of the tension rod 40. On the ring groove 33 between the male portion 31 and the cylinder portion 32, a spring seat 70, incorporating a sleeve portion 72, is mounted.

On the rear end of tension rod 40, a female threaded portion 41 is provided so as to engage with the male threaded portion 31 of the rotational cylinder 30. The front end of the tension rod is of tubular form and protrudes from the housing of the casing 20. The rotation of the tension rod 40 is impeded by the bearing 60 and even when the tension rod 40 is driven by the rotational cylinder 30, the tension rod 40 is only urged in axial direction so as to apply constant tension on chain or belt, because of an urging force converted from rotational force by the bearing 60. In addition, the front end of the tension rod 40 is covered with a cap 43 fixed on the tension rod with a spring pin 42.

The cylinder portion 32 of the rotational cylinder 30 is inserted in the coil portion 51 of the torsion spring 50. The front end 52 of the torsion spring 50 is inserted into the long groove 24 formed on the inner wall of the housing or casing 20. The rear end 53 of the torsion spring 50 is inserted in a slit 34 formed on the rear end of the rotational cylinder 30. Having this type of construction, when torsional torque is provided on the torsion spring by winding the rear end of rotational cylinder 30, the rotational cylinder can be driven by the torsion spring 50. The winding operation can be done by driving the slit on the rear end of the rotational cylinder with tool such as flat driver 80.

Said bearing 60 is mounted on the front end of the casing 20 and fixed with a snap ring 81. The bearing 60 is provided with three protrusions 61 with the angular distance of 120°, which are inserted in corresponding slots formed on the front end of the casing 20 so as not to turn. In other words the bearing 60 works to convert the rotational force given on the tension rod 40 to an urging force. For this reason, the tension rod 40 is externally round and diametrically has two plain surfaces. The mating slot 62 on the bearing 60 is of the same shape so that the tension rod 40 may be inserted freely, into the slot in the axial direction. In FIG. 1, the numeral 82 indicates a seal bolt and the numeral 83 indicates an "O" ring mounted on the rear end of the tensioner for improving airtightness of the seal bolt.

The spring seat 70 incorporating sleeve portion 72 is freely mounted on the ring groove 33. A collar 75 is mounted between the spring seat 70 and said bearing 60 as shown in the FIG. 3. The inner flange portion of the sleeve side of the spring seat abuts. on the front end of cylinder portion 32 and the collar 75 abuts on the front side of flange portion 71 of the spring seat 70.

The sleeve portion 72 is inserted externally on the cylinder portion 32 of the rotational cylinder 30. On this sleeve portion 72, a coil portion 51 of the torsion spring 50 is externally mounted.

Even though the torsion spring is wound by driving the rotational cylinder 30 and the front end of coil portion 51 extends, causing eccentric motion, the coil portion 51 does not penetrate into the ring groove 33 as happens on conventional belt tensioners. Therefore, a normal function of the torsion spring 50 for driving the rotational cylinder 30 can be expected always.

Figure 3:
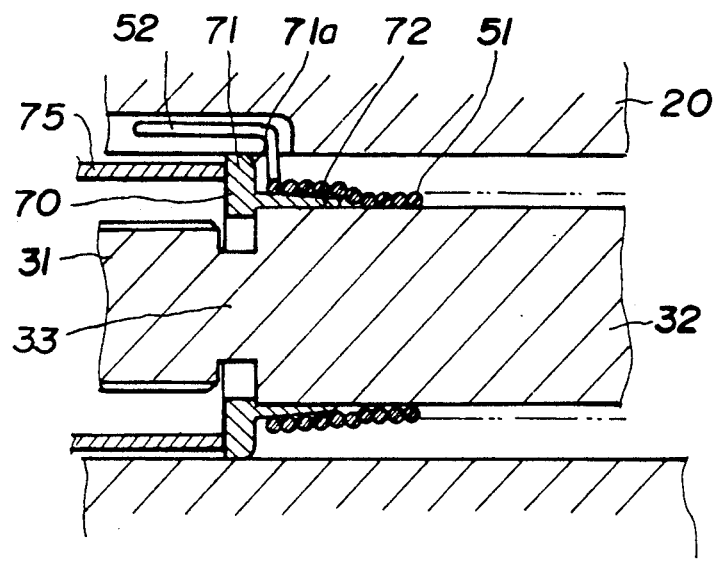
FIG. 3 shows a vertical section of the principal portion of an embodiment.

From FIG. 3, it can be seen that the sleeve portion 72 is gradually tapered to a point so as to facilitate the winding operation.

The collar 75 is of tube form and is coaxially mounted on the tension rod 40 engaged with male thread portion of the rotational cylinder 30 and between the flange portion 71 of the spring seat 70 and the bearing 60. The bearing 60 is fit on the casing 20.

In this condition, the movement of rotational cylinder 30, due to the torsion spring, in the axial direction can be prevented by the spring seat 70 supported by the collar 75. Consequently there is no movement of the rotational cylinder 30 in the axial direction. Also the torsion spring will not cause any trouble when mounted. The spring side edge 71a of the spring seat is rounded. Therefore, even though there is contact between the front end 52 of the torsion spring 50 and said rounded portion, the front end 52 will be hardly damaged due to wear.

Figure 4:
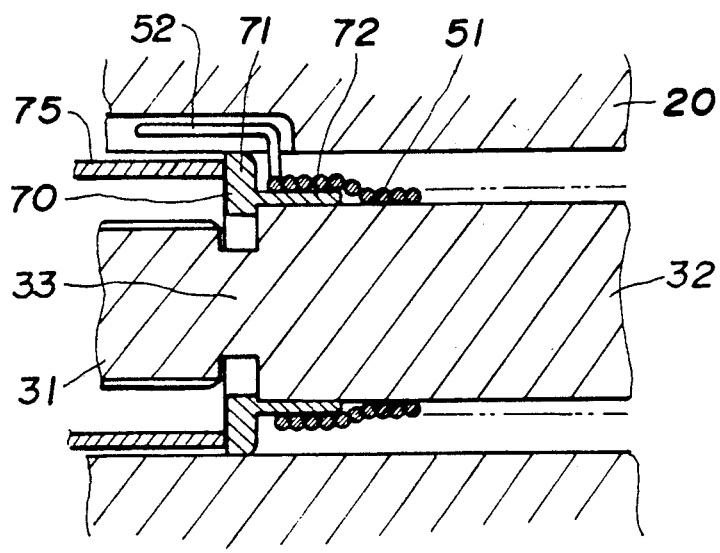
FIG. 4 shows a vertical section of other embodiment.
Figure 5:
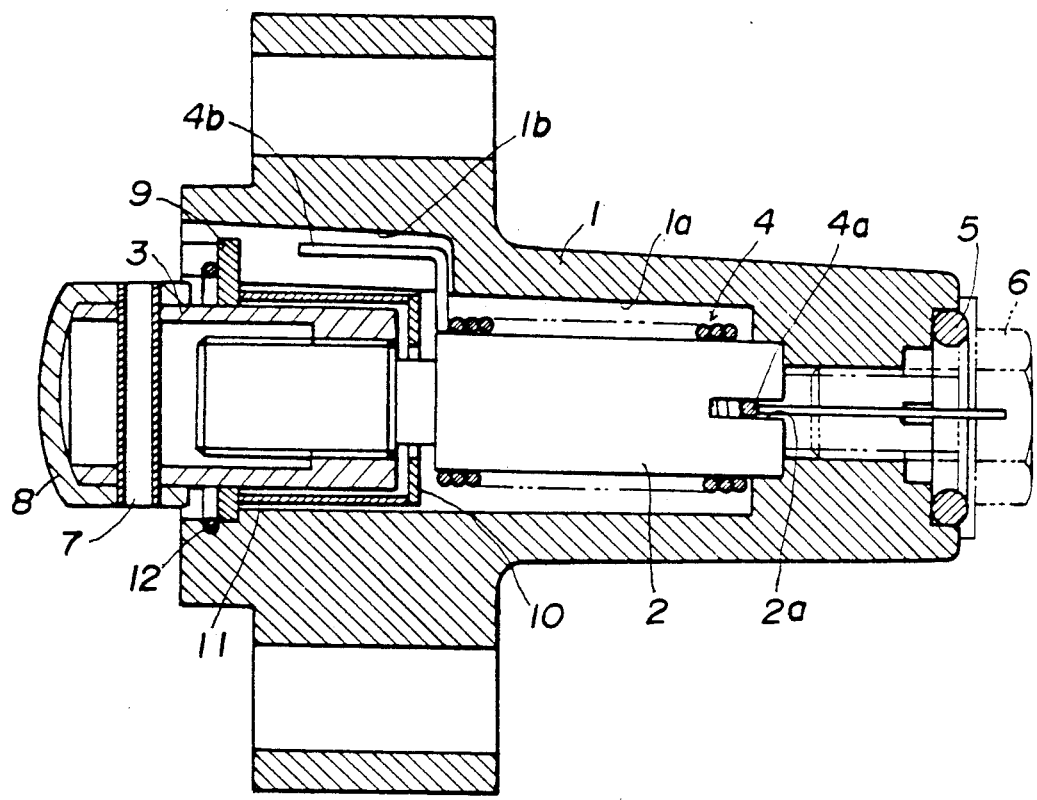
FIG. 5 shows a vertical section of a conventional tensioner.

FIG. 4 shows another embodiment according to the present invention wherein identical components corresponding to the components of the embodiment aforementioned are indicated with identical numbers and repetitive descriptions are omitted. In this case, the thickness of the sleeve portion 72 of the spring seat is formed even. The sleeve portion is inserted between the cylinder portion 32 of the rotational cylinder 30 and the coil portion 52 of the torsion spring 50 so as to separate the coil end from the ring groove 33 of the rotational cylinder 30. In this case, the even thickness of sleeve portion 72 does not affect its basic function for separating adjacent components. Accordingly it is expected that the manufacturing process of spring seat 70 will be simplified.

The following effect can be obtained through the present invention aforementioned. Since the coil end and the cylinder portion are separated by inserting the sleeve portion of the spring seat mounted on the rotational cylinder, even though the coil end eccentrically extends, it will work normally as a torsion spring and not become entangled in the ring groove.

Having this type of construction, the spring seat abuts on the collar and the collar abuts on the bearing preventing the movement of the rotational cylinder in the axial direction. Accordingly, entanglment of the coil end on the rotational cylinder can be eliminated.

What is claimed is:

1. A belt or chain tensioner for a power transmitting system comprising:
   a casing extending in an axial direction and including slots formed therein;
   a torsion spring received within said casing;
   a tension rod extending from said causing;
   a rotational cylinder inserted in said torsion spring so as to rotate and to engage with said tension rod;
   a bearing, through which said tension rod slides, disposed in the slots in said casing for preventing rotation of said tension rod, rotational force applied to said rotational cylinder being converted to an urging force for moving said tension rod in said axial direction;
   a spring seat including a sleeve extending from a first side thereof inserted externally over said rotational cylinder to support said torsion spring, said spring seat stopping movement of said rotational cylinder in said axial direction; and
   a collar mounted between a second side of said spring seat and said bearing.

2. A belt or chain tensioner for a power transmitting system according to claim 1, wherein said spring seat includes a flange portion, an outer and rear edge of the flange portion of said spring seat being rounded sufficiently so as not to damage said torsion spring.

3. A belt or chain tensioner for a power transmitting system according to claim 1, wherein said sleeve has an annular wall overlying said rotational cylinder which is of even thickness.

4. A belt or chain tensioner for a power transmitting system according to claim 1, wherein said sleeve is externally tapered.

* * * * *